United States Patent [19]

Masumoto et al.

[11] Patent Number: 4,650,528
[45] Date of Patent: Mar. 17, 1987

[54] HIGH DAMPING CAPACITY ALUMINUM ALLOY

[75] Inventors: Hakaru Masumoto; Showhachi Sawaya; Masakatsu Hinai, all of Sendai, Japan

[73] Assignee: The Foundation: The Research Institute of Electric and Magnetic Alloys, Sendai, Japan

[21] Appl. No.: 576,800

[22] Filed: Feb. 6, 1984

Related U.S. Application Data

[63] Continuation of Ser. No. 281,695, Jul. 8, 1981, abandoned, which is a continuation-in-part of Ser. No. 180,562, Aug. 25, 1980, abandoned.

[30] Foreign Application Priority Data

Aug. 27, 1979 [JP] Japan .................... 54-108079

[51] Int. Cl.[4] ............................ C22C 21/00
[52] U.S. Cl. .................... 148/437; 148/11.5 A; 148/11.5 R; 148/438; 148/441; 148/442
[58] Field of Search .......... 148/11.5 A, 11.5 R, 148/2, 437, 438, 441, 442

[56] References Cited

U.S. PATENT DOCUMENTS 4,078,946  3/1978  Anthony et al. ............ 148/11.5 A

FOREIGN PATENT DOCUMENTS 55-27142  7/1980  Japan .

OTHER PUBLICATIONS

Journal of Applied Physics, vol. 27, No. 6, Jun. 1956, Granatof and K. Kucke.
Metal Science Journal, 1968, vol. 2, by D. Birchon, D. E. Bromley and D. Healey.
Metal Science Journal, 1973, vol. 7, by Koichi Sugimoto, Takako Mori and Sumitaka Shiode.

Primary Examiner—R. Dean
Attorney, Agent, or Firm—Parkhurst & Oliff

[57] ABSTRACT

A high damping capacity alloy comprising of 0.1–95% by weight of Zn and the remainder of Al and, as the case may be, further comprising of 0.1–50% by weight in total of at least one subingredient of Sn, Pb, Sb, Ce, Cu Ta, Ni, Co, Fe, Nb, Zr, Si, Ti, Ca and B, the alloy having a damping capacity of not less than $6 \times 10^{-1}$ after cold working with a reduction of area of at least 5%, and a process for producing the same.

8 Claims, 8 Drawing Figures

HIGH DAMPING CAPACITY ALUMINUM ALLOY

This is a continuation of application Ser. No. 281,695 filed July 8, 1981, now abandoned, which in turn is a continuation-in-part of application Ser. No. 180,562 filed Aug. 25, 1980, now abandoned.

The present invention relates to high damping capacity aluminum-base alloys suitable for preventing vibration and noise pollution caused by various vehicles and large size machines, deterioration of performance in various precision instruments and electronic instruments due to vibration, and public nuisance resulting from various vibrations and noises under living environment.

In general, the damping capacity ($Q^{-1}$) used for determining the damping performance of the alloy is related to vibrational energy ($\Delta E$) decreased during one cycle of vibration and the total vibrational energy (E) as expressed by the following equation:

$$Q^{-1} = (1/2\pi) \cdot (\Delta E/E)$$

That is, the larger the value of $Q^{-1}$, the amplitude of the vibration becomes smaller in a short period to exhibit a higher damping effect.

Heretofore, there have been known Fe-base alloys such as Gentalloy and the like, Mn—Cu alloys, Al—Cu—Ni alloys, Ni—Ti alloys and so on which have been used as a damping alloy. Among them, the Fe-base alloys and Mn—Cu alloys exhibit a high damping capacity, but have a large specific gravity of about 8 g/cm$^3$, so they are unsuitable if it is intended to reduce the weight of instruments using them. The Al—Cu—Ni and Ni—Ti alloys suffer from the problem that they are fairly poor in cold workability.

It is, therefore, an object of the present invention to provide high damping capacity alloys having a light weight as compared with conventional damping alloys. To accomplish the above objectives, the alloy according to the present invention comprises 0.1–95% (preferably 5–84%, more preferably 5–80%) by weight of zinc and the remainder of aluminum having a small specific gravity of 2.7 g/cm$^3$ or comprises 0.1–95% by weight of zinc, 0.1–50% (preferably 5–84%, more preferably 5–80%) by weight in total of at least one subingredient selected from the group consisting of less than 30% by weight of tin, less than 30% by weight of lead and antimony, less than 20% by weight of cerium, copper and tantalum, less than 15% by weight of nickel, cobalt, iron and niobium, less than 10% by weight of zirconium, silicon, titanium and calcium and less than 3% by weight of boron and the remainder of aluminum. The alloy is subjected to at least cold working with a reduction of area of at least 5% after heat-treatment to increase dislocation thereof and to produce fine grains whereby high damping capacity and high strength are imparted thereto owing to the hysteresis phenomenon of the dislocation and the movement of grains in the boundary.

Next, the production of the alloys according to the present invention will be described in detail below.

First of all, a starting material having the above mentioned composition range is melted in a conventional blast furnace in air or inert gas or under vacuum and thereafter sufficiently stirred to produce a homogeneous molten alloy. Then, the molten alloy is poured into a metal or sand mold to form an ingot.

Moreover, a shielding flux such as MgCl$_2$, borax, CaF$_2$, KCl and the like may be added in a total amount of not more than 5% and a deoxidizer such as magnesium, beryllium and the like may be added in an amount of not more than 0.5% in the melting of the starting material.

According to the present invention, the resulting ingot is subjected to the following treatments.

(A) For the benefit of homogeneous solution treatment, the ingot is heated at a temperature higher than 250° C. and lower than its melting point for 5 minutes to 500 hours (preferably 30 minutes to about 100 hours), and quenched at a cooling rate of 1° C./sec–200° C./sec or annealed at a cooling rate of not less than 1° C./hr, preferably 1° C./sec–1° C./hr. Then, the thus heat-treated ingot is subjected to cold working such as forging, rolling, extruding, swaging, drawing or the like with a reduction of area of at least 5% at room temperature.

(B) After the cold working with a reduction of area of at least 5% in step (A), the ingot is reheated at a temperature of less than 250° C. for more than 1 minute to less than 100 hours, and then cooled at a rate of not less than 1° C./hr to room temperature.

Since unhomogenization of ingredients in the ingot is caused by the temperature difference between the parts of the ingot and the difference of specific gravity between the solid and liquid phases during the solidification of the melt, step A is used to create a homogeneous solution. In this case, the heating time can be shortened when the heating temperature is raised, but when the weight of the resulting ingot is large, it is necessary to prolong the heating time with the raising of the heating temperature. The latter case is based on the fact that the performances of the final product such as damping capacity and the like can be made uniform by a sufficient solution treatment.

The cold working of step (A) will increase the dislocation and produce fine grains due to the working strain. This step is essential in order to obtain a high damping capacity by the hysteresis phenomenon of stress-strain curve caused by the movement of the dislocation and the movement of crystal grains in the boundary so as to increase the tensile strength of the resulting product.

Moreover, the improvement of the damping capacity is satisfactorily achieved only by cold working with a reduction of area of at least 5%, but when the ingot contains a large amount of subingredients, it is often not amenable to a subsequent forming such as bending, deep drawing, punching or the like. Therefore, heat treatment is carried out at a temperature of not more than 250° C. in step (B) after the cold working so that the subsequent forming, such as deep drawing, punching or the like, can be facilitated. In this case, the reason why the heating temperature is limited to not more than 250° C. is due to the fact that when reheating at a temperature of more than 250° C., the damping capacity deteriorates by decreasing the effect of cold working.

The present invention will be described with reference to the accompanying drawings, wherein.

The present invention will be explained with reference to the following examples.

A mixture of total weight of 100 grams having the composition as shown in the following Tables 1, 2 and 3 was melted in an alumina crucible in a high-frequency induction furnace while argon gas was passed therethrough and was then poured into an iron mold to obtain an ingot of 10 mm diameter. Next, the ingot was heated at 350° C. for 5 hours, annealed by slow cooling, and then subjected to cold swaging and drawing, while heating at 350° C. for one hour, to form a wire of 1.1 mm diameter, which was cut into specimens of 150 mm length. The measurement of the damping capacity $Q^{-1}$ was carried out by the inverted torsion pendulum method at a frequency of about 1 Hz and a maximum shear strain amplitude $\gamma_m$ of $10 \times 10^{-6}$.

Figure 1:
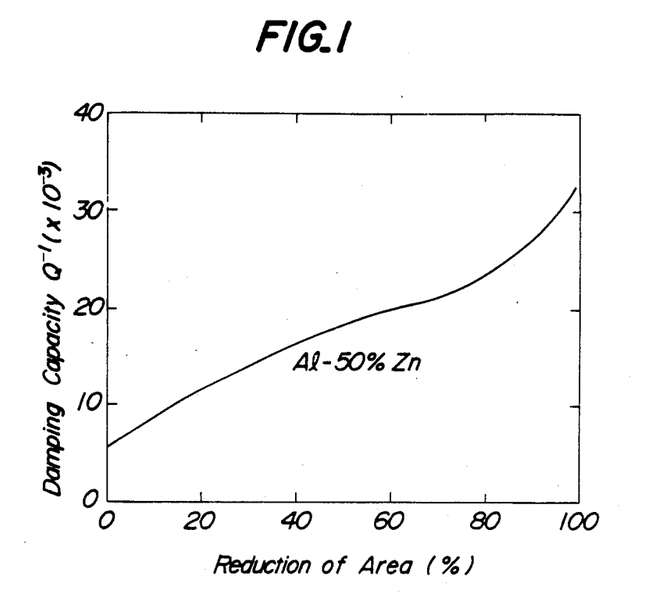
FIG. 1 is a graphical representation of a relationship between the damping capacity $Q^{-1}$ and the reduction of area in the Al—50% Zn alloy after it is heated at 350° C. for 5 hours, annealed and subjected to cold working.
Figure 2:
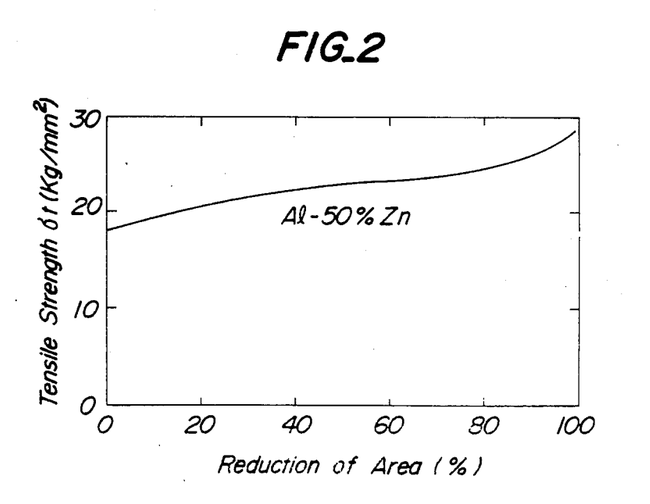
FIG. 2 is a graphical representation of a relationship between the tensile strength $\sigma_t$ and the reduction of area in the same alloy as used in FIG. 1.

The damping capacity $Q^{-1}$ and strength of the Al-base alloy depend upon the reduction of area. For instance, the relationships of the reduction of area to the damping capacity $Q^{-1}$ and the tensile strength $\sigma_t$, after are shown in FIGS. 1 and 2, respectively. As is apparent from these figures, the damping capacity $Q^{-1}$ and tensile strength $\sigma_t$ are increased with the increase of the cold working ratio, which exhibits such a result that the dislocation increases with the increase of the working strain.

In order to obtain a damping capacity $Q^{-1}$ of not less than $6 \times 10^{-3}$ (at $\gamma_m = 10 \times 10^6$), it is necessary that the cold working is carried out at a reduction area of at least 5% after heat-treatment. Preferably, the reduction of area is made large as far as possible and may be 99.99%. The reduction of area is expressed by the following equation:

$$\text{Reduction of area} = \frac{D^2 - d^2}{D^2} \times 100 \ (\%)$$

For instance, when the ingot of 10 mm diameter is reduced to the wire of 0.1 mm diameter, the reduction of area is 99.99%.

The reduction of area and damping capacity $Q^{-1}$ of the Al—Zn alloys are shown in Table 1.

TABLE 1

| Specimen No. | Zn (% by weight) | Al | Cold working ratio (%) | Damping capacity $Q^{-1}$ $\times 10^3$ |
|---|---|---|---|---|
| 1 | 30.0 | remainder | 95 | 14 |
| 2 | 40.0 | remainder | 71 | 19 |
| 3 | 50.0 | remainder | 71 | 23 |
| 4 | 50.0 | remainder | 49 | 19 |
| 5 | 60.0 | remainder | 95 | 34 |
| 6 | 60.0 | remainder | 71 | 26 |
| 7 | 70.0 | remainder | 95 | 49 |
| 8 | 80.0 | remainder | 95 | 52 |
| 9 | 80.0 | remainder | 71 | 47 |
| 10 | 90.0 | remainder | 95 | 51 |

The values of damping capacity $Q^{-1}$ of the alloys obtained by adding at least one subingredient to the Al—Zn alloy and subjecting the product to cold working with a reduction of area of 95% are shown in Tables 2 and 3.

TABLE 2

| Specimen No. | Zn | Sn | Pb | Sb | Ce | Cu | Ta | Ni | Co | Fe | Nb | Zr | Si | Ti | B | Ca | Al | Damping capacity $Q^{-1}$ ($\times 10^{-3}$) |
|---|---|---|---|---|---|---|---|---|---|---|---|---|---|---|---|---|---|---|
| | | | | | | | (% by weight) | | | | | | | | | | | |
| 11 | 70.0 | 5.0 | — | — | — | — | — | — | — | — | — | — | — | — | — | — | remainder | 58 |
| 12 | 70.0 | — | 2.0 | — | — | — | — | — | — | — | — | — | — | — | — | — | " | 50 |
| 13 | 60.0 | — | — | 3.0 | — | — | — | — | — | — | — | — | — | — | — | — | " | 41 |
| 14 | 60.0 | — | — | — | 3.0 | — | — | — | — | — | — | — | — | — | — | — | " | 45 |
| 15 | 70.0 | — | — | — | — | 3.0 | — | — | — | — | — | — | — | — | — | — | " | 50 |
| 16 | 70.0 | — | — | — | — | — | 3.0 | — | — | — | — | — | — | — | — | — | " | 52 |
| 17 | 60.0 | — | — | — | — | — | — | 3.0 | — | — | — | — | — | — | — | — | " | 40 |
| 18 | 70.0 | — | — | — | — | — | — | — | 5.0 | — | — | — | — | — | — | — | " | 60 |
| 19 | 60.0 | — | — | — | — | — | — | — | — | 2.0 | — | — | — | — | — | — | " | 42 |
| 20 | 60.0 | — | — | — | — | — | — | — | — | — | 3.0 | — | — | — | — | — | " | 42 |
| 21 | 50.0 | — | — | — | — | — | — | — | — | — | — | 1.0 | — | — | — | — | " | 34 |
| 22 | 40.0 | — | — | — | — | — | — | — | — | — | — | — | 5.0 | — | — | — | " | 32 |
| 23 | 70.0 | — | — | — | — | — | — | — | — | — | — | — | — | 3.0 | — | — | " | 50 |
| 24 | 70.0 | — | — | — | — | — | — | — | — | — | — | — | — | — | 0.5 | — | " | 50 |
| 25 | 70.0 | — | — | — | — | — | — | — | — | — | — | — | — | — | — | 3.0 | " | 52 | the Al—50% Zn alloy is heated at 350° C. for 5 hours, annealed and subjected to cold swaging and drawing,

TABLE 3

| Specimen No. | Zn | Sn | Pb | Sb | Ce | Cu | Ta | Ni | Co | Fe | Nb | Zr | Si | Ti | B | Ca | Al | Damping capacity $Q^{-1}$ ($\times 10^{-3}$) |
|---|---|---|---|---|---|---|---|---|---|---|---|---|---|---|---|---|---|---|
| | | | | | | | (% by weight) | | | | | | | | | | | |
| 26 | 60.0 | 2.0 | 1.0 | 1.0 | — | — | — | — | — | — | — | — | — | — | — | — | remainder | 49 |
| 27 | 60.0 | — | — | — | 1.0 | 1.0 | 2.0 | — | — | — | — | — | — | — | — | — | " | 45 |
| 28 | 60.0 | — | — | — | — | — | — | 1.0 | 2.0 | 1.0 | — | — | — | — | — | — | " | 43 |
| 29 | 60.0 | — | — | — | — | — | — | — | — | — | 1.0 | 1.0 | 2.0 | — | — | — | " | 45 |

TABLE 3-continued

| Specimen No. | Zn | Sn | Pb | Sb | Ce | Cu | Ta | Ni | Co | Fe | Nb | Zr | Si | Ti | B | Ca | Al | Damping capacity $Q^{-1}$ ($\times 10^{-3}$) |
|---|---|---|---|---|---|---|---|---|---|---|---|---|---|---|---|---|---|---|
| | | | | | | | (% by weight) | | | | | | | | | | | |
| 30 | 60.0 | — | — | — | — | — | — | — | — | — | — | — | — | 1.0 | 1.0 | 2.0 | " | 43 |
| 31 | 70.0 | 1.0 | 1.0 | 0.5 | 0.5 | 0.5 | — | — | — | — | — | — | — | — | — | — | " | 55 |
| 32 | 70.0 | — | — | — | — | — | 0.5 | 0.5 | 1.0 | 0.5 | 1.0 | — | — | — | — | — | " | 60 |
| 33 | 70.0 | — | — | — | — | — | — | — | — | — | — | 0.5 | 1.0 | 0.2 | 0.5 | 0.5 | " | 54 |
| 34 | 60.0 | 1.0 | 0.5 | 0.5 | 0.2 | 0.5 | — | — | — | — | — | — | — | — | 0.2 | 0.2 | " | 51 |
| 35 | 60.0 | — | — | — | — | — | 0.5 | 0.5 | 1.0 | 0.5 | 0.5 | 0.1 | 0.2 | 0.1 | — | — | " | 50 |
| 36 | 70.0 | 1.0 | 0.2 | 0.2 | 0.2 | 0.2 | 0.3 | 0.2 | 0.5 | 0.2 | 0.2 | 0.2 | 0.5 | 0.2 | 0.2 | 0.2 | " | 60 |

The aluminum article after cold working with a reduction of area of 95% has a damping capacity $Q^{-1}$ of $4 \times 10^{-3}$, which is unsuitable as a damping material in light of the goal of the present invention. However, when more than 0.1% by weight of zinc as well as 0.1–50% by weight in total of at least one subingredient are added to the aluminum article, there can be obtained a damping capacity $Q^{-1}$ of not less than $6 \times 10^{-3}$. As is apparent from Tables 1-3, the Al—Zn alloys have a fairly high damping capacity, but the damping capacity is further improved when at least one subingredient is added to the Al—Zn alloy. In brief, it will be understood that the damping capacity $Q^{-1}$ of the alloys according to the present invention is tens of times the damping capacity of usual methods of $Q^{-1} = 1 \times 10^{-3}$. Furthermore, the specific gravity $\rho$ of the alloy according to the present invention is fairly small compared to that of usual metal, while the tensile strength $\sigma_t$ thereof is fairly high compared to that of the cold worked aluminum article of $\sigma_t = 10$ kg/cm². For instance, the specimen No. 3 has $\sigma_t = 24$ kg/mm² and $\rho = 4.0$ g/cm³, the specimen No. 7 has $\sigma_t = 13$ kg/mm² and $\rho = 4.9$ g/cm³, the specimen No. 11 has $\sigma_t = 25$ kg/mm² and $\rho = 5.1$ g/cm³, and the specimen No. 19 has $\sigma_t = 20$ kg/mm² and $\rho = 4.5$ g/cm³.

Figure 4:
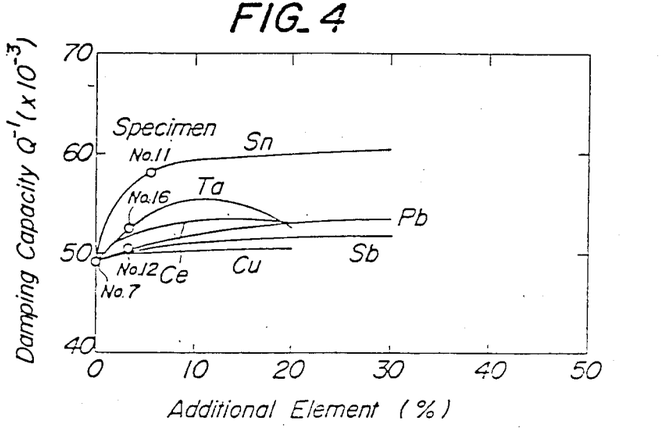
FIG. 4 is a characteristic diagram showing the relation between damping capacity $Q^{-1}$ of Al—70% Zn alloy and the content of additional elements of Sn, Pb, Sb, Ta Ce, Cu.

The addition effect of each additional element of tin (Sn), lead (Pb), antimony (Sb), cerium (Ce), copper (Cu), tantalum (Ta) which serves to increase the damping capacity $Q^{-1}$ of Al—70% Zn alloy is shown in FIG. 4.

Figure 5:
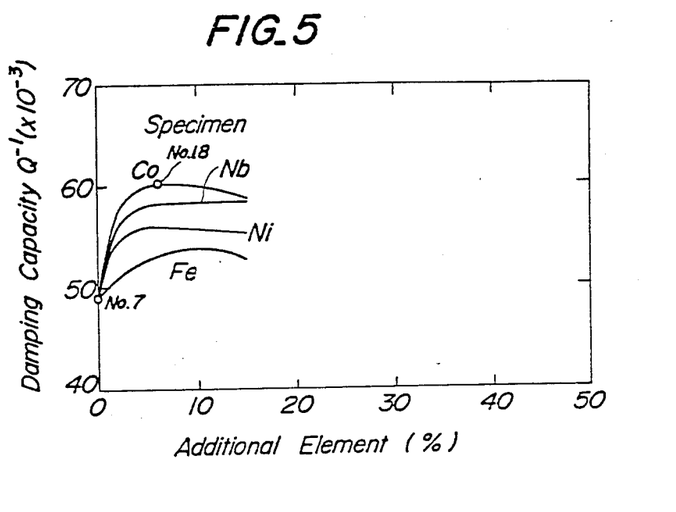
FIG. 5 is a characteristic diagram showing the relation between damping capacity $Q^{-1}$ of Al—70% Zn alloy and the content of additional elements of Ni, Co, Fe and Nb.

The addition effect of each additional element of nickel (Ni), cobalt (Co), iron (Fe) and niobium (Nb) to Al—70% Zn alloy is shown in FIG. 5.

Figure 6:
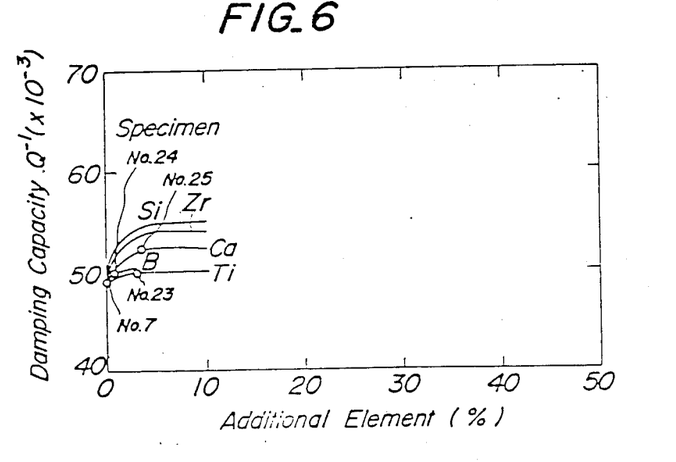
FIG. 6 is a characteristic diagram showing the relation between damping capacity $Q^{-1}$ of Al—70% Zn alloy and the content of additional elements of Si, Zr, Ti, Ca and B.

The addition effect of each additional element of zirconium (Zr), silicon (Si), titanium (Ti), calcium (Ca) and boron (B) to Al—70% Zn alloy is shown in FIG. 6.

Figure 3:
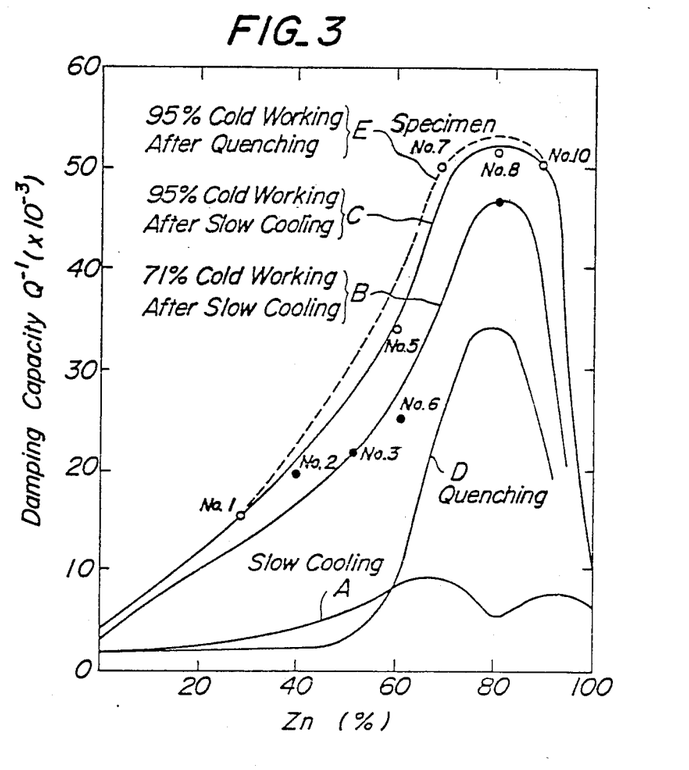
FIG. 3 is a characteristic diagram showing the relation between damping capacity $Q^{-1}$ of Al—Zn alloy and the content of zinc.

In FIG. 3, the curve A shows a feature of damping capacity $Q^{-1}$ of Al—Zn alloy obtained by slow cooling from 350° C. Curves B and C show features of damping capacity $Q^{-1}$ obtained by cold working with a reduction of area of 71% and 95% respectively after slow cooling from 350° C. Curve D shows a feature obtained by quenching from 350° C. as comparative.

Curve E shows a feature obtained by cold working after quenching from 350° C.

As can be seen from FIG. 3, the damping capacity $Q^{-1}$ of curve A or D by slow cooling or quenching is very small although it becomes large with additionally applied cold working, while the damping capacity $Q^{-1}$ of pure aluminum is about $2-4 \times 10^{-3}$, and the damping capacity $Q^{-1}$ of the Al—Zn alloy including 5 to 95% zinc subjected to cold working of 71% and 95% is more than $6 \times 10^{-3}$ to $55 \times 10^{-3}$ as shown in Table 1 and FIG. 3.

The reason for the limitation of the composition of the alloy of the invention is as follows.

According to the present invention, zinc as well as at least one subingredient selected from tin, lead, antimony, cerium, copper, tantalum, nickel, cobalt, iron, niobium, zirconium, silicon, titanium, calcium and boron within their upper limit contribute not only to the improvement of the damping capacity $Q^{-1}$ and workability, but also to the improvement of strength. The exceptions are lead and tin which only contribute to the improvement of damping capacity $Q^{-1}$ and workability.

The excess addition of a subingredient noted above, except lead or tin, to an Al—Zn alloy causes the alloy to become unworkable.

The effects of the various elements of the damping alloy according to the claimed invention are set forth in the following table:

| Element in Al—Zn alloy in wt % | Damping capacity | | Mechanical strength | | Workability | |
|---|---|---|---|---|---|---|
| | Suitable amount | Excess amount | Suitable amount | Excess amount | Suitable amount | Excess amount |
| Zn 0.1–95% | o | (x) | o | (x) | o | (o) |
| Pb <30% | o | (o) | x | (x) | o | (o) |
| Sn <30% | o | (o) | x | (x) | o | (o) |
| Sb <30% | o | (x) | o | (o) | o | (x) |
| Ce <20% | o | (x) | o | (o) | o | (x) |
| Cu <20% | o | (x) | o | (o) | o | (x) |
| Ta <20% | o | (x) | o | (o) | o | (x) |
| Co <15% | o | (x) | o | (o) | o | (x) |
| Nb <15% | o | (x) | o | (o) | o | (x) |
| Ni <15% | o | (x) | o | (o) | o | (x) |
| Fe <15% | o | (x) | o | (o) | o | (x) |
| Zr <10% | o | (x) | o | (o) | o | (x) |
| Si <10% | o | (x) | o | (o) | o | (x) |
| Ti <10% | o | (x) | o | (o) | o | (x) |
| Ca <10% B <3% | o | (x) | o | (o) | o | (x) |

Note:
o indicates increase of its feature in suitable amount of addition of subingredient.
(x) indicates decrease of its feature in excess amount of addition of subingredient.

The reason why the content of the zinc is defined as from 0.1 to 95% (preferably 5 to 84%) is as follows:

If the zinc content becomes less than 0.1% by weight, the damping capacity will become less than $6 \times 10^{-3}$ and the goal of the present invention to have damping capacity $Q^{-1}$ of not less than $6 \times 10^{-3}$ can not be attained. As can be seen from FIG. 3, the damping capacity $Q^{-1}$ becomes large with the increase of zinc content, it peaks with a zinc content of about 80% and the damping capacity $Q^{-1}$ quickly decreases when the zinc content increases beyond 80%.

If the zinc content of the aluminum alloy exceeds 95 wt%, its mechanical strength is greatly decreased by the addition of an excess amount of zinc. The alloy then becomes too heavy, and even though damping capacity is not decreased when the zinc content is increased to 95% by weight, damping capacity will deteriorate if zinc is added in an amount greater than 95 wt%. It then becomes impossible to apply cold working by addition of excess amounts of several subingredients, and damping capacity deteriorates through the addition of excess amounts of subingredients.

In general, damping alloys can be classified according to their mechanism of damping as set forth in the following table:

| Title | Mechanism of damping capacity | Example |
|---|---|---|
| Compound type | boundary slipping or boundary-migration between grains and adhering movement of the surface between precipitation phase and matrix | flake graphite cast iron, Al—Zn alloy |
| Ferro-magnetic type | movement of magnetic domain due to the external stress applied thereto | 12% Cr steel NIVCO—10 alloy, Fe, Ni, T.D. nickel |
| Dislocation type | movement by the mechanical static hysteresis in the mutual influence of impurity atoms and slipping dislocation | Mg, Mg-0.6% Zr alloy (KIXI)Zn |
| Microtwin boundary type | energy loss due to movement of boundary between martensite phase and matrix thereof or the movement of twin boundary in the thermal elastic martensite over the transformation point | Mn—Cu, Cu—A— Ni, TINI |

Generally, if a body is made to vibrate, the vibrations are ultimately damped to zero. This is due to the fact that the energy of the vibrations is transformed into heat within the body which is dissipated. The heat is generated by internal friction within the body. An alloy having high damping capacity is associated with high values of internal friction. As set forth in the table above, the mechanisms of internal friction are classified into compound type, ferro-magnetic type, domain moving or dislocation type, and twin domain or micro-twin boundary type. The alloy of the claimed invention belongs to the dislocation type and/or the compound type, even though aluminum zinc alloys have been conventionally classified as of the compound type.

The high damping capacity of the damping alloy of the claimed invention results from the fact that the energy of vibration is dissipated through dislocations due to slipping or movement by the mechanical static hysteresis in the mutual influence of impurity atoms and slipping or migration in the grain boundary and adhesive movement of the surface between phase and matrix. That is, the damping mechanism of the damping alloy of the claimed invention is quite different from that of ferromagnetic type damping alloys.

Conventionally, the theory of mechanical damping due to dislocation may be explained by reference to FIG. 7.

The successive drawings indicate schematically the bowing out of a pinned dislocation line by an increasing applied stress. The length of loop determined by impurity pinning is denoted by $L_c$, and determined by the network by $L_N$. As stress increases, the $L_c$ bow out until break away occurs. For very large stresses, the dislocation is multiplied according to the Frank-Read mechanism.

It is assumed that a pure single-crystal contains, prior to deformation, a network of dislocations, such as Mott assumed in his paper on work-hardening. For large enough concentrations of impurity atoms, the length of loop determined by the intersection of the network loops is further pinned down by the impurity particles through the Cottrell mechanism. Such a model was used by Friedel to describe the anomaly in the rigidity modulus copper alloys for small concentrations found by Bradfield and Pursey. There are, therefore, two characteristic lengths in the model: The network length $L_N$ and the length $L_c$, determined by the impurities. The model is further modified mathematically to take account of the fact that a distribution of lengths occurs.

If an external stress is now applied, there will be, in addition to elastic strain, an additional strain due to the dislocations, which strain is referred to as dislocation strain. The stress-dislocation strain law is, in general, a function of frequency. However, as will be shown, it is independent of frequency for lower frequencies including the kilocycle range (quasi-static behavior). Qualitatively the action of a dislocation length under the influence of an increasing external stress can be seen from FIG. 7. For zero applied stress the length $L_N$ is pinned down by the impurity particles (A). For a very large stress (B) the loops ($L_c$) bow out and continue to bow out until breakaway stress is reached. The effective modulus of the stress-dislocation strain curve is determined by $L_c$ in this range. At breakaway stress, a large increase in the dislocation strain occurs for no increase in the stress (C-D). Now, for further increase in the stress, the loop length ($L_N$) bows out (D-E) until the stress required to activate the Frank-Read source ($L_N$) is reached. It is assumed that the network pinning is so strong that no breakaway of network lengths occurs. In this interval (D-E), the effective modulus is determined by the length $L_N$. Further increases in the applied stress lead to creation and expansion of new closed dislocation loops (F-G). The dislocation strain due to this process is known to be irreversible and may be referred to as plastic strain. From the foregoing illustration, and the analysis with its modifications which follow, a qualitative picture of the stress-dislocation strain law may be obtained.

Figure 8:
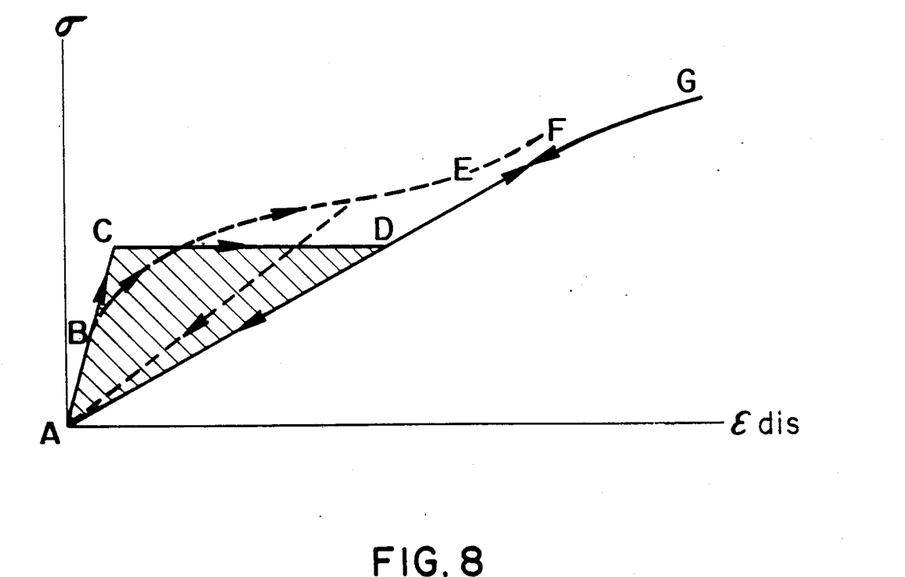
FIG. 8 is a characteristic diagram showing the stress strain law that results for the model shown in FIG. 7.

In FIG. 8, the stress-dislocation law corresponding to the above model is shown.

It is apparent that the losses are made up of two different types. The first loss is due to the fact that the measurement is a dynamic one. Because the motion forced by the external stress is opposed by some damping mechanism, there is a phase leg for an oscillating stress, and hence a decrement and change of modulus. This type of loss is frequency dependent, since it has a resonance type character. It is largest near the resonance frequency determined by a loop length, and goes to zero for very low and very high frequency.

The second type loss is due to the fact that during the unloading part of the stress cycle (D-A), the long loops collapse elastically along the path determined by the long loop length, thus giving a hysteresis loop. When the loops have completely collapsed they are again pinned by the impurity particles and the same length type of that as followed in the other half-cycle. This loss is simply proportional to the area enclosed by the stress-dislocation strain loop. For small stresses, it does not occur. Because of the fact that, in the frequency range considered, the stress-dislocation strain law is independent of frequency, this loss is frequency independent.

Figure 7:
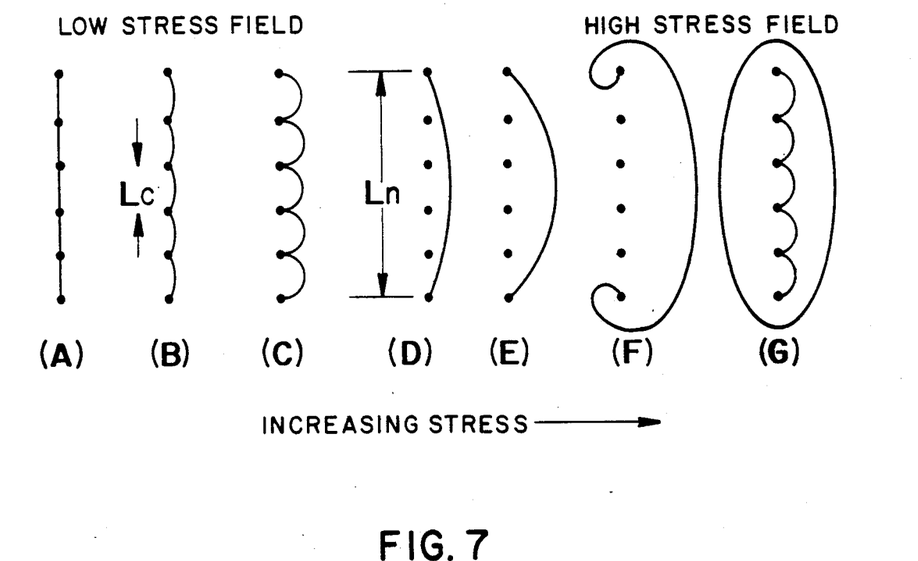
FIG. 7 is a characteristic diagram showing successive drawings which schematically indicate the bowing out of a pinned dislocation line by an increasing applied stress.

The solid line in FIG. 8 shows the stress strain law that results for the model shown in FIG. 7 above. The elastic strain has been subtracted out so that only the dislocation strain is shown. The path ABCDEF is followed for increasing stress, while the path FA is followed for decreasing stress. The dashed line curve is that which would result if not all of the loops have the same length, but there is a distribution of length $L_c$.

The damping mechanism of the alloy of the claimed invention is as follows.

The solubility limit of zinc to aluminum single crystal phase is very small at room temperature, so this results in a binary solid solution structure of an aluminum rich alpha phase mixed with a zinc rich beta phase. Thus, the heat-treated aluminum zinc alloy is composed of a mixture of alpha phase and beta phase crystal grains. When stress in the form of vibration is applied to damping alloys of the Al—Zn series, the energy is dissipated due to the adhesive movement between those grains. As a result, damping is induced.

If cold working is applied to the heat-treated aluminum zinc series alloys, the crystal grains become fine and dislocations are simultaneously introduced into the crystal latice of the aluminum zinc alloys. If the crystal grains become fine, the grain boundaries increase so that the damping capacity $Q^{-1}$ becomes large due to the adhesive movements such as slipping or migration in the boundary. The loop composed of a matrix of solid solution and the atom of impurity precipitated in the matrix of said solid solution acts as pinning against the movement of dislocation, such as slipping or migration, the hysteresis of the loop being caused in the stress-strain curve by stress dislocation strain law. This pinning is known in conventional Grant-Lucke theory. *Journal of Applied Physics*, Vol. 27, No. 6, June 1956. This hysteresis caused the damping. Dislocations in grain structure are increased by cold working, and damping capacity $Q^{-1}$ becomes large due to the hysteresis mentioned.

The essential factors for obtaining a high-damping alloy are as follows: (a) composition, (b) heat treatment, (c) cold working. If a particular composition does not fall within suitable composition range, high damping capacity will not be obtained. However, even if the composition falls within the appropriate range, if appropriate heat treatment is not selected, high damping capacity will also not be obtained. Further, even if the composition and the heat treatment are appropriately selected and applied, if appropriate cold working is not applied, high damping capacity will not be obtained either.

For the above reasons, the content of zinc is limited to 0.1 to 95% (preferably 5 to 84%) by weight.

FIG. 4 shows the increase of damping capacity $Q^{-1}$ as increase of additional element of Sn, Pb, Sb, Ta, Ce, Cu in Al—70% Zn alloy subjected to cold working according to the present invention. As can be seen from FIG. 4, the workability is not deteriorated by the addition of an amount of Sn or Pb in excess of 30% by weight, but the mechanical strength is deteriorated and the product becomes too heavy. The cold working becomes impossible with an addition of an amount of Sb in excess of 30% by weight or the addition of Ta, Ce, Cu of more than 20% by weight.

For the aforesaid reason, the content of Sn, Pb and Sb is limited to not more than 30%.

FIG. 5 illustrates the increase of damping capacity $Q^{-1}$ as increase of additional element of Ni, Co, Fe and Nb in Al—70% Zn alloy subjected to cold working according to the present invention. As can be seen from FIG. 5, the cold working becomes impossible when Ni, Co, Fe and Nb are added in excess of 15% by weight.

For the above reason, the content of Ni, Co, Fe and Nb is limited to not more than 15% by weight.

FIG. 6 illustrates the increase of damping capacity $Q^{-1}$ as increase of additional element of Si, Zr, Ti, Ca and boron (B) in Al—70% of Zn alloy subjected to cold working according to the present invention.

As can be seen from FIG. 6, the cold working becomes impossible with the addition of Si, Zr, Ti or Ca in excess of 10% or the addition of B in excess of 3%. Therefore, the content of Si, Zr, Ti, Ca is limited to not more than 10% and the content of boron is limited to not more than 3% by weight.

The reason why the reheating temperature should be less than 250° C. is as follows:

The eutectoid temperature of Al—Zn alloy is about 275° C. If the Al—Zn alloy is heated to a temperature higher than the eutectoid temperature of 275° C., said effect of cold working is dissipated.

If the reheating is applied to Al—Zn alloy at a temperature of more than 250° C., the damping capacity $Q^{-1}$ is deteriorated.

To prevent deterioration of the damping capacity $Q^{-1}$, the reheating temperature is limited to less than 250° C.

The alloys according to the present invention are characterized by having a high damping capacity, a light weight, a good cold workability, and a non-ferromagnetic property. Therefore, the alloys according to the present invention are very suitable and useful in preventing vibration and noise as well as to save weight when the alloys are used in various vehicles and large size machines, movable parts of electronic instruments, magnetic field functioning parts, various household articles. building materials and the like.

What is claimed is:

1. A damping alloy product having a high damping capacity of not less than $6 \times 10^{-3}$, consisting essentially of 10-80% by weight of zinc and the remainder of aluminum, said alloy having been subjected to heat-treatment and a cold working with a reduction of area of at least 5%.

2. A damping alloy product having a high damping capacity of not less than $6 \times 10^{-3}$, consisting of 10-80% by weight of zinc, 0.1-50% by weight in total of at least one subingredient selected from the group consisting of not more than 30% by weight of tin, not more than 30% by weight of lead and antimony, not more than 20% by weight of cerium, copper and tantalum, not more than 15% by weight of nickel, cobalt, iron and niobium, not more than 10% by weight of zirconium, silicon, titanium and calcium and not more than 3% by weight of boron, and the remainder of aluminum, said alloy having been subjected to heat-treatment and a cold working with a reduction of area of at least 5%.

3. A shaped article having a damping capacity of not less than $6 \times 10^{-3}$ and composed of a damping alloy consisting essentially of 10-80% by weight of zinc and the remainder of aluminum produced by heating said alloy at a temperature higher than 250° C. and lower than its melting point for not less than 5 minutes to not more than 500 hours to conduct homogeneous solution treatment; cooling at a suitable cooling rate of 200° C./sec to 1° C./hr; and subjecting to a cold working with a reduction of area of at least 5%, whereby said damping capacity is made not less than $6 \times 10^{-3}$.

4. A shaped article having a damping capacity of not less than $6 \times 10^{-3}$ and composed of a damping alloy consisting essentially of 10-80% by weight of zinc, 0.1–50% by weight in total of at least one subingredient selected from the group consisting of not more than 30% by weight of tin, not more than 30% by weight of lead and antimony, not more than 20% by weight of cerium, copper and tantalum, not more than 15% by weight of nickel, cobalt, iron and niobium, not more than 10% by weight of zirconium, silicon, titanium and calcium and not more than 3% by weight of boron and the remainder of aluminum; produced by heating said alloy at a temperature higher than 250° C. and lower than its melting point for not less than 5 minutes to not more than 500 hours to conduct homogeneous solution treatment; cooling at a suitable cooling rate of 200° C./sec to 1° C./hr; and subjecting to a cold working with a reduction of area of at least 5%, whereby said damping capacity is made not less than $6 \times 10^{-3}$.

5. The damping alloy product of claim 1, wherein 30–70% by weight of said product is zinc.

6. The damping alloy product of claim 2, wherein 30–70% by weight of said product is zinc.

7. The shaped article of claim 3, wherein 30–70% by weight of said article is zinc.

8. The shaped article of claim 4, wherein 30–70% by weight of said article is zinc.

* * * * *